United States Patent
Tran et al.

(10) Patent No.: US 9,092,225 B2
(45) Date of Patent: Jul. 28, 2015

(54) SYSTEMS AND METHODS FOR REDUCING BRANCH MISPREDICTION PENALTY

(75) Inventors: Thang M. Tran, Austin, TX (US); Michael B. Schinzler, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 596 days.

(21) Appl. No.: 13/362,720

(22) Filed: Jan. 31, 2012

(65) Prior Publication Data

US 2013/0198490 A1 Aug. 1, 2013

(51) Int. Cl.
*G06F 9/38* (2006.01)

(52) U.S. Cl.
CPC .............. *G06F 9/3851* (2013.01); *G06F 9/381* (2013.01); *G06F 9/3804* (2013.01)

(58) Field of Classification Search
CPC .. G06F 9/3861; G06F 9/30058; G06F 9/3806
USPC ...................................... 712/E9.051
See application file for complete search history.

(56) References Cited

U.S. PATENT DOCUMENTS

| | | | |
|---|---|---|---|
| 5,604,877 A * | 2/1997 | Hoyt et al. | 712/243 |
| 5,794,028 A * | 8/1998 | Tran | 712/240 |
| 5,918,046 A * | 6/1999 | Hoyt et al. | 712/239 |
| 6,014,734 A * | 1/2000 | Tran et al. | 712/23 |
| 6,119,223 A * | 9/2000 | Witt | 712/244 |
| 7,493,621 B2 | 2/2009 | Bradford et al. | |
| 7,617,499 B2 | 11/2009 | Bradford et al. | |
| 2007/0083712 A1 | 4/2007 | Bradford et al. | |
| 2007/0083740 A1 | 4/2007 | Bradford et al. | |
| 2007/0204137 A1* | 8/2007 | Tran | 712/214 |
| 2007/0288733 A1* | 12/2007 | Luick | 712/237 |
| 2007/0288734 A1* | 12/2007 | Luick | 712/237 |
| 2008/0201529 A1 | 8/2008 | Bradford et al. | |
| 2008/0201565 A1 | 8/2008 | Bradford et al. | |
| 2009/0125913 A1 | 5/2009 | Bradford et al. | |

* cited by examiner

*Primary Examiner* — Idriss N Alrobaye
*Assistant Examiner* — Christine Johnson (57) ABSTRACT

In a processing system capable of single and multi-thread execution, a branch prediction unit can be configured to detect hard to predict branches and loop instructions. In a dual-threading (simultaneous multi-threading) configuration, one instruction queues (IQ) is used for each thread and instructions are alternately sent from each IQ to decode units. In single thread mode, the second IQ can be used to store the "not predicted path" of the hard-to-predict branch or the "fall-through" path of the loop. On mis-prediction, the misprediction penalty is reduced by getting the instructions from IQ instead of instruction cache.

14 Claims, 5 Drawing Sheets

SYSTEMS AND METHODS FOR REDUCING BRANCH MISPREDICTION PENALTY

BACKGROUND

1. Field

This disclosure relates generally to data processors, and more specifically, to the execution of branch and loop instructions by data processors.

2. Related Art

Branch target buffers have been used to improve processor performance by reducing the number of cycles spent in execution of branch instructions. Branch target buffers act as a cache of recent branches and accelerate branches by providing either a branch target address (address of the branch destination) or one or more instructions at the branch target prior to execution of the branch instruction, which allows a processor to more quickly begin execution of instructions at the branch target address.

Branch lookahead schemes are also used to accelerate branch processing, and operate by scanning ahead into the sequential instruction stream, looking for upcoming branch instructions in advance of their execution, and computing branch target addresses of branches early, to allow branch target instructions to be fetched in advance of branch instruction execution, in case the branch is taken.

Branch prediction logic may be used with both BTB and branch lookahead schemes to allow for an early prediction of the outcome (taken or not taken) of a conditional branch, prior to the resolution of the branch condition, thus allowing for increased branch performance when accuracy of the predictor is high.

As the number of pipeline stages within the data processing systems increases, the size of the branch target buffer (BTB) is typically increased in order to increase the hit rate and reduce the branch misprediction performance penalty. However, increasing the size of the BTB results in increased die area, access time, and power required for the BTB and its operation. Additionally, as the number of pipeline stage increases, the branch misprediction penalty increases. For the hard to predict branches, the increase in misprediction penalty will degrade performance of the processing system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

As discussed above, as the number of pipeline stage increases, the branch misprediction penalty increases, which degrades performance of the processing system. Therefore, in some embodiments, in a processing system capable of single and multi-thread execution, a branch prediction unit can be configured to detect hard to predict branches and loop instructions. In a dual-threading (simultaneous multi-threading) configuration, one instruction queues (IQ) is used for each thread and instructions are alternately sent from each IQ to decode units. In single thread mode, the second IQ can be used to store the "not predicted path" of the hard-to-predict branch or the "fall-through" path of the loop. On mis-prediction, the mis-prediction penalty is reduced by getting the instructions from IQ instead of instruction cache. Upon execution of a hard-to-predict branch instruction, if the branch is correctly predicted, then the group of instructions is invalidated to allow another hard-to-predict branch to use the second IQ. If the branch is mispredicted, then the group of instructions are selected to be sent to decode and all other groups of instructions in the IQ are invalidated. If a group of instructions in an IQ is for a loop instruction, then the instruction remains in the IQ until the loop instruction is mispredicted.

Figure 1:
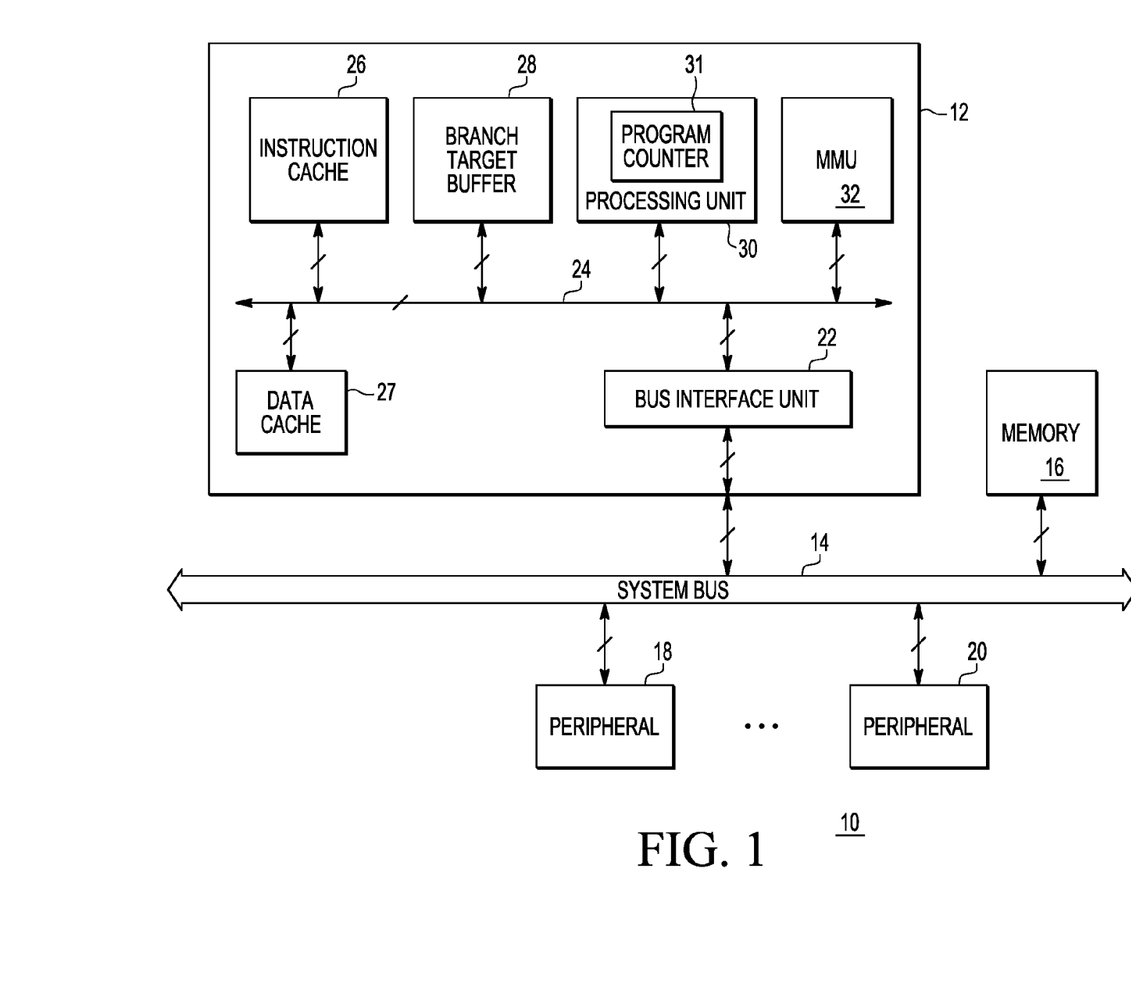
FIG. 1 illustrates in block diagram form a data processing system having a branch target buffer (BTB) in accordance with aspects of the present invention.

FIG. 1 illustrates, in block diagram form, a data processing system 10 in accordance with one embodiment of the present invention. Data processing system 10 includes a processor 12, a system bus 14, a memory 16 and a plurality of peripherals such as a peripheral 18, a peripheral 20 and, in some embodiments, additional peripherals as indicated by the dots in FIG. 1 separating peripheral 18 from peripheral 20. Memory 16 is a system memory that is coupled to system bus 14 by a bidirectional conductor that, in one form, has multiple conductors. In the illustrated form each of peripherals 18 and 20 is coupled to system bus 14 by bidirectional multiple conductors as is processor 12. Processor 12 includes a bus interface unit (BIU) 22 that is coupled to system bus 14 via a bidirectional bus having multiple conductors. BIU 22 is coupled to internal bus 24 via bidirectional conductors. Internal bus 24 is a multiple-conductor communication bus. Coupled to internal bus 24 via respective bidirectional conductors is an instruction cache 26, a data cache 27, a branch target buffer (BTB) 28, a central processing unit (processing unit) 30, and a memory management unit (MMU) 32. Processing unit 30 is a computer processor for implementing data processing operations. Within processing unit 30 is a program counter 31 which is a storage device such as a register for holding a count value. Each of instruction cache 26, BTB 28, processing unit 30 and MMU 32 are coupled to internal bus 24 via a respective input/output (I/O) port or terminal. In alternate embodiments, system bus 14 may be implemented as a cross bar switch or interconnect fabric.

In operation, processor 12 functions to implement a variety of data processing functions by executing a plurality of data processing instructions. Instruction cache 26 is a temporary data store for frequently-used information that may be needed by processing unit 30. Information needed by processing unit 30 that is not within cache 26 is stored in memory 16. MMU 32 controls interaction of information between processing unit 30 and instruction cache 26 and memory 16. For example, MMU 32 translates between virtual addresses (as used, for example, within processing unit 30) and physical addresses (as used, for example, by instruction cache 26 and memory 16). BIU 22 may be one of several interface units between processor 12 and system bus 14. BIU 22 functions to coordinate the flow of information related to instruction execution including branch instruction execution by processing unit 30. Control information and data resulting from the execution of a branch instruction are exchanged between processing unit 30 and system bus 14 via BIU 22. BTB 28 is a buffer for storing a plurality of entries. Each of the entries stores an instruction address which corresponds to a branch instruction, a corresponding branch target address for the branch instruction, corresponding status information, and corresponding branch prediction information. Fewer or additional information can be stored in each entry. Processing unit 30 generates instruction addresses which are provided to the instruction pipeline within processing unit 30 and are sent via internal bus 24 to BTB 28. BTB 28 contains a subset of instruction addresses that may be generated by processing unit 30. In response to receiving an instruction address from processing unit 30 which hits in BTB 28, BTB 28 provides a branch target address and associated status information to processing unit 30. Note that the branch target address provided by BTB 28, as will be described in further detail below, is speculative and thus may result in a misprediction.

Figure 2:
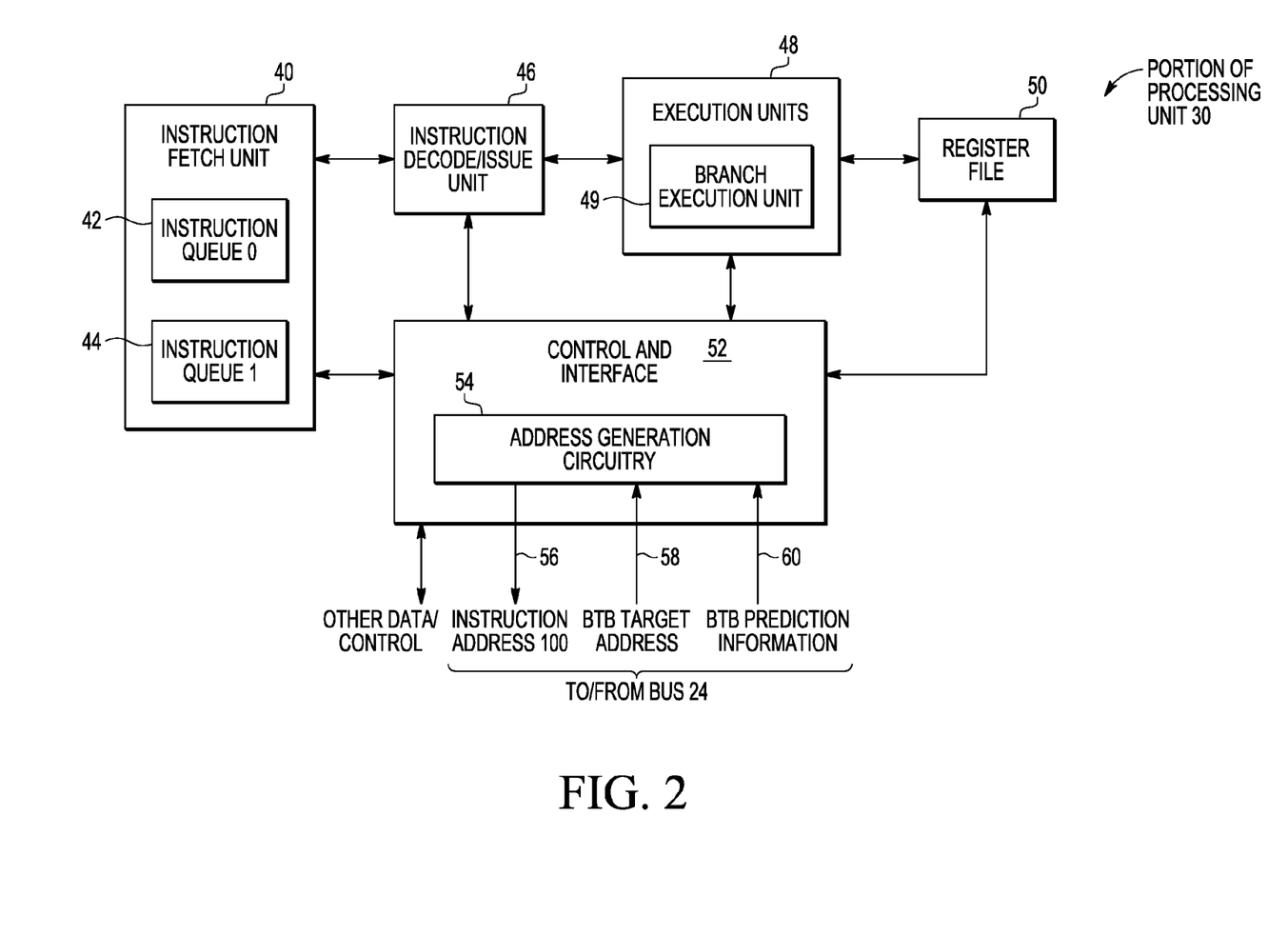
FIG. 2 illustrates in block diagram form a portion of a processing unit of the data processing system of FIG. 1 in accordance with aspects of the present invention.

Illustrated in FIG. 2 is a more detailed portion of processing unit 30 of FIG. 1 that relates to the execution of instructions and the use of BTB 28. Processing unit 30 includes a control and interface unit 52, an instruction fetch unit 40, an instruction decode/issue unit 46, execution unit(s) 48, and a register file 50. Control and interface unit 52 includes address generation circuitry 54, and is bidirectionally coupled to each of instruction fetch unit 42, instruction decode unit 46, execution unit(s) 48, and register file 50. Address generation circuitry 54 provides an instruction address 100 to bus 24, and receives a BTB target address 58, and BTB prediction information 60 from bus 24. Address generation circuitry 54 may also communicate other data/control information with bus 24. Instruction fetch unit 40 includes a first instruction queue 42 and a second instruction queue 44. Instruction fetch unit 40 is bidirectionally coupled to instruction decode/issue unit 46. Execution unit(s) 48 include a branch execution unit 49 and may include one or more additional execution units, as needed within processing unit 30.

In the illustrated portion of processing unit 30, control and interface unit 52 controls instruction fetch unit 40 to implement the fetching of instructions from instruction cache 26 or memory 16 (FIG. 1). Instruction decode/issue unit 46 performs instruction decoding for the one or more execution unit(s) 48. Register file 50 is used to information to support execution unit(s) 48. Within control and interface unit 52 is address generation circuitry 54. Address generation circuitry 54 sends out an instruction address 56 to BTB 28 (FIG. 1), and, in response, may receive a BTB target address 58 and BTB prediction information 60. The BTB target address 58 is used by processing unit 30 to obtain an instruction at the target address from either instruction cache 26 or memory 16 if the target address is not present and valid within instruction cache 26.

Figure 3:
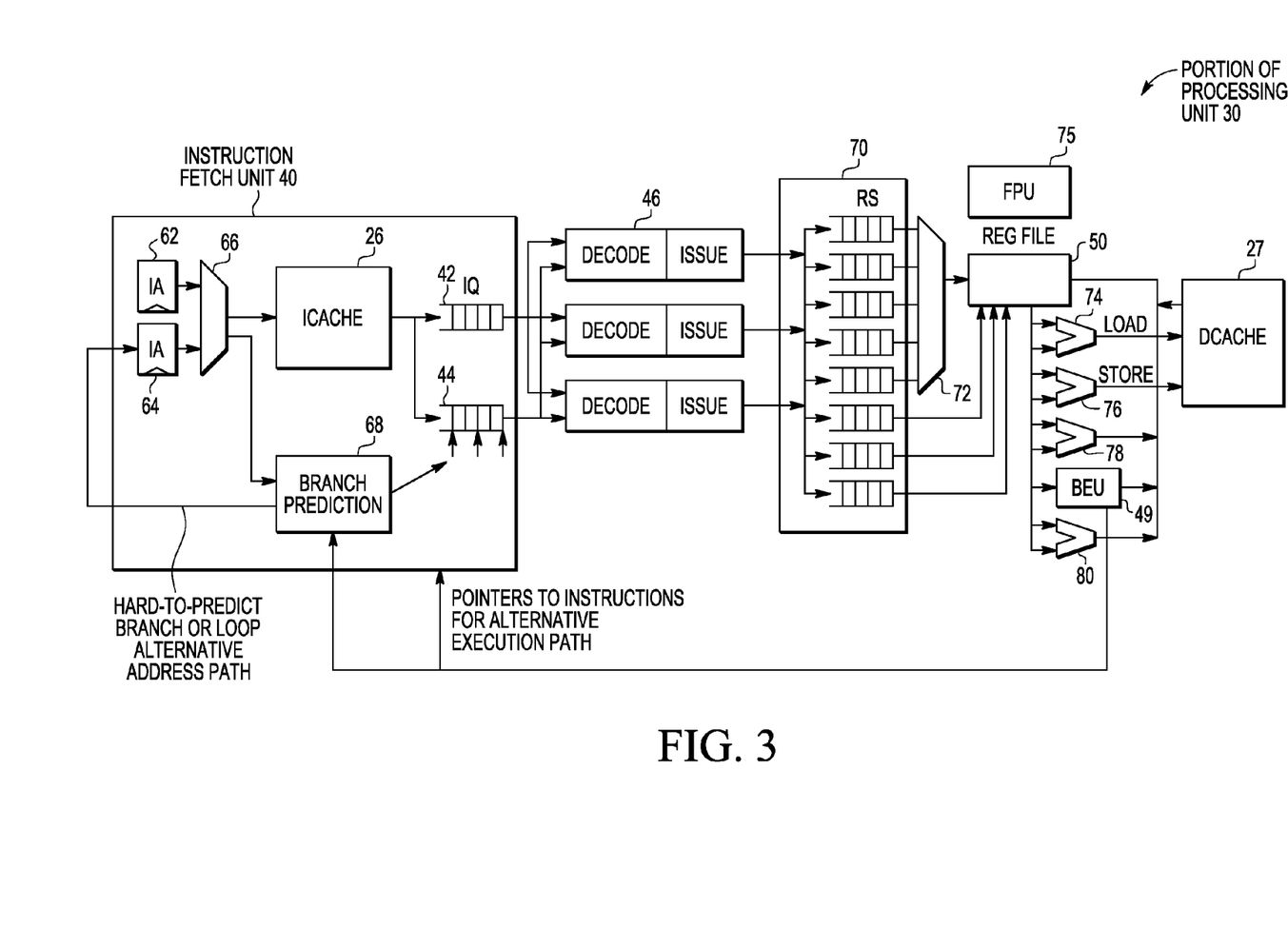
FIG. 3 illustrates in block diagram form a portion of the processing unit of FIG. 1 in accordance with aspects of the present invention.

Referring to FIG. 3, a diagram of an embodiment components in processing unit 30 of FIG. 1 including instruction address buffers 62, 64, instruction address arbiter 66, instruction cache 26, branch prediction unit 68, instruction queues 42, 44, instruction decode/issue units 46, execution queues 70, execution queue arbiter 72, floating point execution unit 75, register file 50, instruction execution units 74, 76, 78, 80, branch instruction execution unit (BEU) 49, and Level 1 (L1) data cache 27.

Branch prediction unit 68 supplies instruction addresses in instruction address queues 62, 64 for loop instructions and instructions that are hard-to-predict. Instruction arbiter 66 sends the address of the next instruction to enter the pipeline of processing unit 30 to instruction cache 26 and to branch prediction unit 68. BEU 49 sends information such as pointers to instructions for alternative execution path to instruction queues 42, 44 and branch prediction unit 68.

Instruction queues 42, 44 implement instruction queues configured to provide program instructions to respective decode/issue units 46. Decode/issue units 46 can include logic to multiplex valid instructions, decode instructions for instruction type, source, and destination operands, generate queue entries and tags for instructions, rename instruction operands to a latest register mapping, forward renamed registers from a next stage, determine source and destination register dependencies between instructions, check dependency with previous instructions in execution queues, and separate complex instructions into micro-instructions.

Decode/issue units 46 can issue instructions to execution queues 70, and update register renaming for issued instructions. Processing unit 30 can further schedule execution of instructions using arbiter 72, which arbitrates the sequence load/store, branch, integer, and complex integer instructions issued to corresponding execution units 49, 74-80.

Referring to FIGS. 1, 2 and 3, BTB 28 receives instruction addresses from processing unit 30 and determines whether instruction address results in a hit within BTB 28. BTB prediction information for instruction address returned back to processing unit 30 may include a hit indication (e.g., based on hit way signals) and prediction information. Also, the branch target address is provided as a BTB target address to processing unit 30. In one embodiment, instruction addresses are fetched by instruction fetch unit 40 (either individually or in groups of two or more at a time) from instruction cache 26 or memory 16.

Each instruction fetched by instruction fetch unit 40 is placed in one of instruction queues 42, 44 and provided as instruction address to BTB 28 to determine whether or not BTB 28 indicates that the instruction address corresponds to a branch instruction. For example, if an instruction address results in a miss in BTB 28, it is assumed that instruction address is not a branch instruction, and processing of the instruction address continues through the instruction pipeline of processing unit 30 (and indication of the miss may be provided to processing unit via the BTB prediction information). However, if the instruction address results in a hit in BTB 28, it is assumed the instruction address is a branch instruction, and the BTB prediction information may be used to determine whether the branch instruction should be taken or not taken. If, for example, an instruction address hits in BTB 28 and the BTB prediction information received from BTB 28 indicates a taken branch, then control and interface 52 may provide the BTB target address (received from BTB 28) to instruction fetch unit 40 so that fetching can speculatively begin at the branch target address.

Eventually, the instruction address reaches instruction queue 42, 44 and proceeds through the instruction pipeline of processing unit 30. That is, the instruction address is provided from instruction register 42 or 44 to instruction decode/issue unit 46 for decode, and then to one of respective execution unit(s) 49, 74-80 for execution (which may access register file 50, as needed). If the instruction address is decoded as a branch instruction, it is resolved by branch execution unit 49.

When the instruction address is resolved, it is known whether or not BTB 28 correctly predicted the branch instruction of the instruction address as taken. If the branch was correctly predicted, execution continues from the current location. If the branch was mispredicted, processing unit 30 can address the misprediction, flush the pipeline as needed, and return execution to the point at which the misprediction occurred (such as returning to instruction address 100 and fetching the next sequential instruction). Therefore, a misprediction may occur when a hit occurs in BTB 28, but the branch is not correctly predicted as taken or not taken, or may occur if BTB 28 correctly predicts the branch as taken but incorrectly predicts the target address. A misprediction may also occur if the instruction address hits in BTB 28 but turns out to not be a branch instruction. For example, it may be determined by instruction decode unit 46 that the instruction address was actually not a branch instruction, which also results in a misprediction needing to be addressed by processing unit 30.

Furthermore, for each instruction address, BTB 28 may be allocated or updated as needed. For example, when an instruction results in a miss in BTB 28 and is decoded by instruction decode unit 46 as a taken branch instruction, a new entry can be allocated for the branch instruction into BTB 28. Also, if a branch which did hit in BTB 28 results in a misprediction, its corresponding entry in BTB 28 may be appropriately updated.

Figure 4:
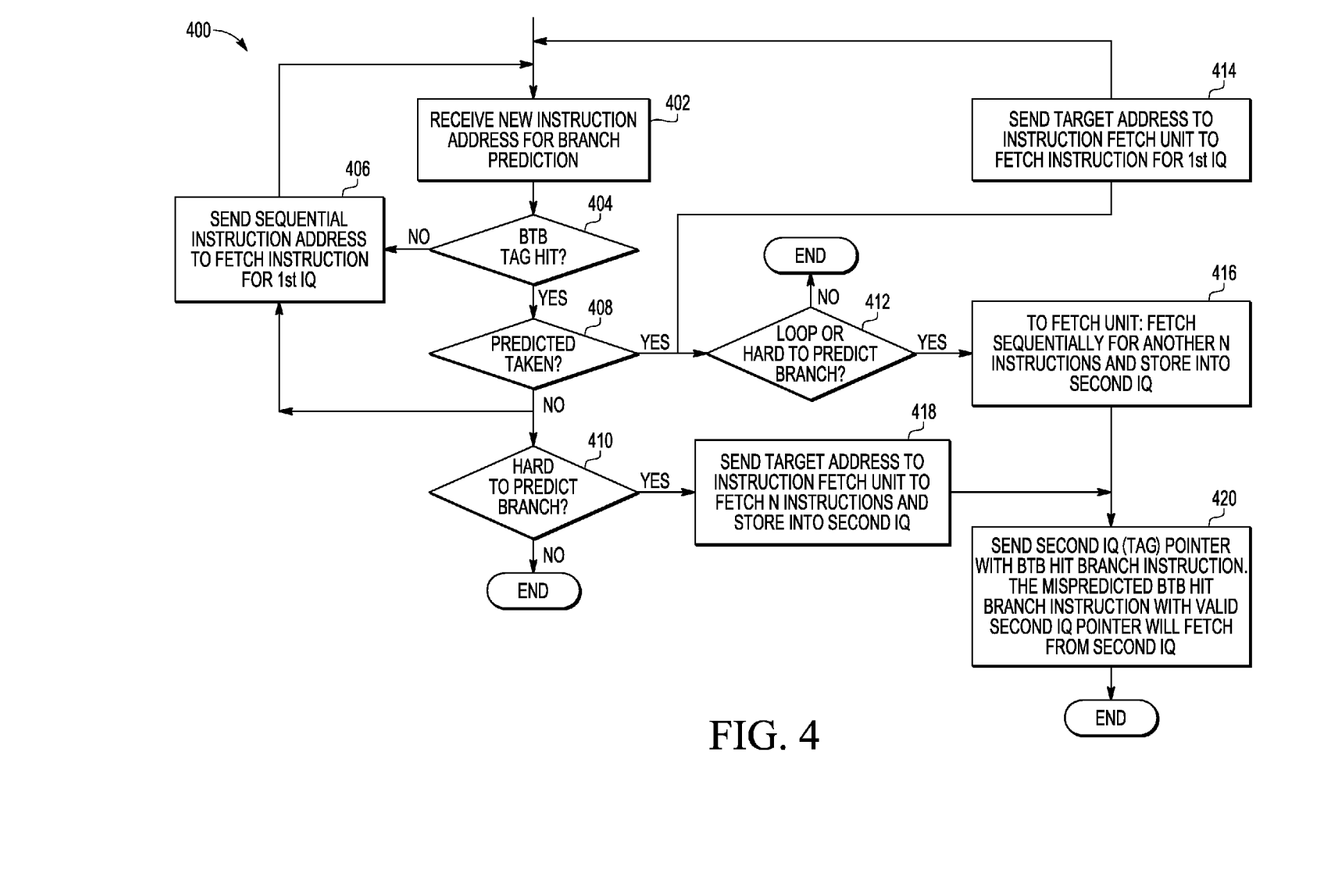
FIG. 4 illustrates in flow diagram form a method for handling branch and loop instructions in single thread mode in accordance with one aspect of the present invention.

Illustrated in FIG. 4 in flow diagram form is a method 400 for handling branch and loop instructions in instruction fetch unit 40 (FIG. 3) in single thread mode in accordance with one embodiment of the present invention. Process 402 receives an instruction address, fetches an instruction from the instruction address, and stores the instruction in an instruction queue. Process 404 determines whether the instruction address hits in the BTB. If the instruction address hits in the BTB, process 408 uses an entry in the BTB which resulted in the hit to determine whether the first instruction is a conditional branch and whether it is predicted as a taken branch or a non-taken branch.

In response to determining that the first instruction is a conditional branch and predicted as a taken branch in process 408, process 414 can include providing a target address from the entry in the BTB to the instruction fetch unit, and fetching a second instruction from the target address and storing the second instruction in the first instruction queue. Additionally, if process 412 determines that the instruction is a conditional (e.g. a loop instruction or a hard-to-predict branch instruction), process 416 can include fetching one or more sequential instructions which are sequential to the first instruction and storing the one or more sequential instructions in the second instruction queue.

Referring back to process 408, in response to determining that the first instruction is a conditional branch and predicted as a non-taken branch, process 406 can send a sequential address to the first instruction to the instruction fetch unit and store a subsequent instruction fetched from the sequential address in the first instruction queue. An identifier identifies a location in the second instruction queue of the one or more sequential instructions. If the first instruction is a conditional branch and predicted as a not-taken branch, the identifier identifies a location in the second instruction queue of the subsequent instruction.

Additionally, process 410 can determine whether the instruction is a hard-to-predict branch instruction. In response to determining that the instruction is a hard-to-predict branch instruction, process 418 can send the target address from the entry in the BTB to the instruction fetch unit, fetch N instructions fetched from the target address, and store the N instructions in the second instruction queue.

If processes 416 or 418 are executed, then process 420 can determine if the first instruction is a conditional branch, and if so, provide an identifier with the first instruction to the decode unit and the branch execution unit. The identifier identifies a location in the second instruction queue of one or more instructions which are to be executed if the first instruction is mispredicted. Process 420 can also provide the instruction from the first instruction queue to the decode unit, and issue the instruction from the decode unit for execution. The branch execution unit resolves the instruction to determine if the prediction made using the entry in the BTB is correct or mispredicted. If the branch execution unit determines that the first instruction is mispredicted, the identifier is used to provide the one or more instructions from the second instruction queue to the decode unit for execution. If the branch execution unit determines that the first instruction is predicted correctly, however, the instruction(s) in the second instruction queue indicated by the identifier are invalidated. If the branch execution unit determines that the first instruction is predicted correctly, the identifier is invalidated.

Figure 5:
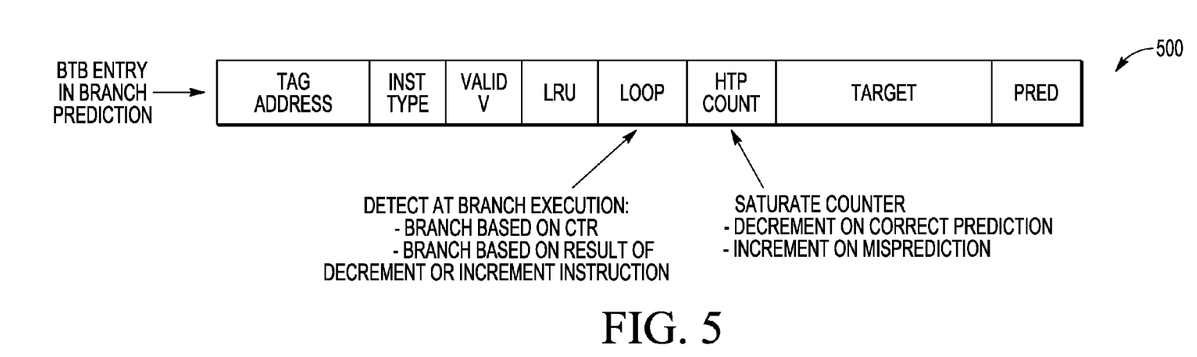
FIG. 5 illustrates in diagrammatic form an embodiment of an entry for the BTB of FIG. 1 in accordance with aspects of the present invention.

Illustrated in FIG. 5 in block diagram form is an embodiment of an entry for the BTB 28 of FIG. 1 in accordance with aspects of the present invention. Entry 500 includes a tag address, an instruction type field, a valid field, a least recently used (LRU) field, a loop field, a hard-to-predict (HTP) count field, a target address, and a prediction (pred) field. Various fields, such as the instruction type field, the valid field, and the LRU field may be used, for example, during allocation into BTB 28 (FIG. 1). The prediction field may include prediction information such as whether or not the branch corresponding to the tag address is predicted taken or not taken. The loop field can be used to indicate that a corresponding instruction is a loop instruction and can be detected at branch execution. The branch can be based on a counter, such as a loop counter that is decremented on certain branch operations in the PowerPC architecture. The HTP count field can be used to indicate a tendency for past conditional branches on the branch prediction by incrementing/decrementing toward taken/not taken states.

Note that the number of bits for each field may vary, depending on the application, and more or less fields may be present than those illustrated. Furthermore, the format of entry 500 can be different than the illustrated format.

Figure 6:
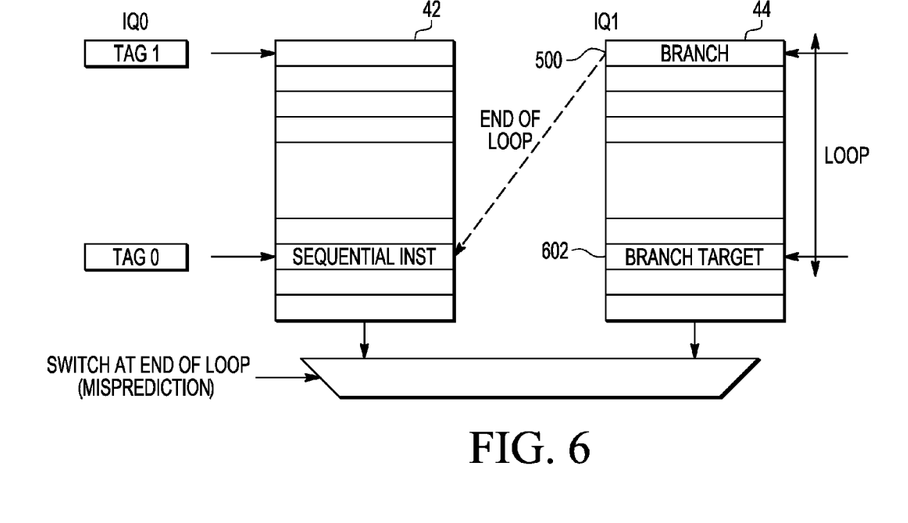
FIG. 6 illustrate in diagrammatic form entries in the BTB of FIG. 3 in accordance with various aspects of the present invention.

Illustrated in FIG. 6 in block diagram form are sets of entries in first and second instruction queues 42, 44 of FIG. 2 in accordance with various aspects of the present invention. The first entry 602 in a loop in instruction queue 44 includes the address of a branch target. A branch instruction 500 is shown at the end of the loop in instruction queue 44. If the instruction address for entry 602 hits in the BTB, the entry is used to determine whether the instruction is a conditional branch and whether it is predicted as a taken branch or a non-taken branch. If the instruction is a conditional branch and predicted as a taken branch, a target address is provided from the entry in the BTB to the instruction fetch unit, and one or more sequential instructions are fetched from the target address and stored in the first instruction queue 42. If the prediction was not correct, execution switches to the instructions in the first instruction queue 42. The branch execution unit 49 (FIG. 2) resolves the first instruction to determine if the prediction made using the entry in the BTB is correct or mispredicted.

Note that instruction queue 44 can be the primary queue for sending instructions to decode/issue unit 46. The sequential instruction is kept in secondary queue 42. Once the branch instruction 500 is executed in branch execution unit 49 and mispredicted, then the sequential instruction is sent to decode unit 46. Instruction queue 42 becomes the primary instruction queue and instruction queue 44 becomes the secondary instruction queue. TAG 0 is the identifier that was sent with the branchs instruction 500 to branch execution unit 49

By now it should be appreciated that in one embodiment, there has been provided a data processing system 10, 12 or 30 having an instruction fetch unit 40, a decode unit 46, and a branch execution unit 49. The instruction fetch unit includes a branch target buffer (BTB) 68, a first instruction queue 42 for providing instructions to the decode unit, and a second instruction queue 44 for providing instructions to the decode unit. The decode unit issues instructions for execution. A first instruction address is provided to the instruction fetch unit 402. A first instruction is fetched from the first instruction address and the first instruction is stored in the first instruction queue. It is then determined whether the first instruction address hits in the BTB 404. In response to determining that the first instruction address hits in the BTB, an entry in the BTB which resulted in the hit is used to determine whether the first instruction is a conditional branch and whether it is predicted as a taken branch or a non-taken branch 408. In response to determining that the first instruction is a conditional branch and predicted as a taken branch yes from 408, a target address is provided from the entry in the BTB to the instruction fetch unit 414. A second instruction is fetched from the target address and storing the second instruction in the first instruction queue 414. One or more sequential instructions which are sequential to the first instruction are fetched and stored in the second instruction queue 416. In response to determining that the first instruction is a conditional branch and predicted as a non-taken branch no from 408, the target address from the entry in the BTB is provided to the instruction fetch unit 418. A third instruction is fetched from the target address and storing in the second instruction queue 418. A sequential address to the first instruction is provided to the instruction fetch unit 406. A fourth instruction fetched from the sequential address is stored in the first instruction queue 406.

In another aspect, the first instruction from the first instruction queue is provided to the decode unit; and the first instruction is issued from the decode unit for execution. The branch execution unit resolves the first instruction to determine if the prediction made using the entry in the BTB is correct or mispredicted.

In another aspect, the first instruction from the first instruction queue is provided to the decode unit. If the first instruction is a conditional branch, an identifier is provided with the first instruction to the decode unit and the branch execution unit. The identifier identifies a location in the second instruction queue of one or more instructions which are to be executed if the first instruction is mispredicted 420.

In another aspect, if the first instruction is a conditional branch and predicted as a taken branch, the identifier identifies a location in the second instruction queue of the one or more sequential instructions; and if the first instruction is a conditional branch and predicted as a not-taken branch, the identifier identifies a location in the second instruction queue of the fourth instruction.

In a further aspect, if the branch execution unit determines that the first instruction is mispredicted, the identifier is used to provide the one or more instructions from the second instruction queue to the decode unit for execution 420.

In still another aspect, if the branch execution unit determines that the first instruction is predicted correctly, the one or more instructions in the second instruction queue indicated by the identifier 420 are invalidated.

In another aspect, if the branch execution unit determines that the first instruction is predicted correctly, invalidating the identifier 420.

In another aspect, the conditional branch is further characterized as one of a hard-to-predict branch or a loop instruction.

In another aspect, the first instruction is determined to be a conditional branch that is characterized as one of a hard-to-predict branch or a loop instruction based on the entry in the BTB which resulted in the hit.

In another aspect, in response to determining that the first instruction misses in the BTB, one or more sequential instructions which are sequential to the first instruction are fetched and stored in the first instruction queue 406.

In another embodiment, a data processing system includes a branch execution unit 49, a decode unit 46 coupled to the branch execution unit that issues instructions for execution, and an instruction fetch unit 40 having a branch target buffer BTB 68, a first instruction queue 42 for providing instructions to the decode unit, and a second instruction queue 44 for providing instructions to the decode unit. The instruction fetch unit fetches a first instruction from a first instruction address and stores the first instruction in the first instruction queue; determines whether the first instruction address hits in the BTB 404, and in response to determining that the first instruction address hits in the BTB, uses an entry in the BTB which resulted in the hit to determine whether the first instruction is a conditional branch and whether it is predicted as a taken branch or a non-taken branch 408. In response to determining that the first instruction is a conditional branch and predicted as a taken branch: a target address is obtained from the entry in the BTB; a second instruction is fetched from a target address and stored in the first instruction queue 414; and one or more sequential instructions are fetched which are sequential to the first instruction and stored in the second instruction queue 416. In response to determining that the first instruction is a conditional branch and predicted as a non-taken branch: the target address is obtained from the entry in the BTB. A third instruction from the target address is fetched and stored in the second instruction queue 418. A fourth instruction is fetched from a sequential address that is sequential to the first instruction address 406. The fourth instruction is stored in the first instruction queue 406.

In another aspect, the instruction fetch unit provides the first instruction from the first instruction queue to the decode unit; and the decode unit issues the first instruction for execution. The branch execution unit resolves the first instruction to determine if the prediction made using the entry in the BTB is correct or mispredicted.

In another aspect, the system further includes storage circuitry, wherein when the instruction fetch unit determines that the first instruction is a conditional branch, an identifier is stored in the storage circuitry to identify a location in the second instruction queue of one or more instructions which are to be executed if the first instruction is resolved as mispredicted 420.

In a further aspect, if the branch execution unit determines that the first instruction is mispredicted, the instruction fetch unit uses the identifier to provide the one or more instructions from the second instruction queue to the decode unit for execution 420. If the branch execution unit determines that the first instruction is predicted correctly, the instruction fetch unit uses the identifier to invalidate the one or more instructions in the second instruction queue 420.

In another aspect, the conditional branch is further characterized as one of a hard-to-predict branch or a loop instruction, wherein the instruction fetch unit uses the entry in the BTB which resulted in the hit to characterize the conditional branch as one of a hard-to-predict branch or a loop instruction.

In a further embodiment, in a data processing system having an instruction fetch unit 40, a decode unit 46, and a branch execution unit 49, the instruction fetch unit having a branch target buffer BTB 68, a first instruction queue 42 for providing instructions to the decode unit, and a second instruction queue 44 for providing instructions to the decode unit, the decode unit issuing instructions for execution, a method comprises providing a first instruction address to the instruction fetch unit; fetching a first instruction from the first instruction address and storing the first instruction in the first instruction queue; and determining whether the first instruction address hits in the BTB 404. In response to determining that the first instruction address hits in the BTB: using an entry in the BTB which resulted in the hit to determine whether the first instruction is predicted as a taken branch or a non-taken branch 408, and determining whether the first instruction is a hard-to-predict branch 410, 412. In response to determining that the first instruction is predicted as a taken branch and is a hard-to-predict branch yes from 408 and 412: providing a target address from the entry in the BTB to the instruction fetch unit 414; fetching a second instruction from the target address and storing the second instruction in the first instruction queue 414; and fetching one or more sequential instructions which are sequential to the first instruction and storing the one or more sequential instruction in the second instruction queue 416. In response to determining that the branch instruction is predicted as a non-taken branch and is a hard-to-predict branch no from 408 and yes from 410: providing the target address from the entry in the BTB to the instruction fetch unit; 418 fetching a third instruction fetched from the target address and storing the third instruction in the second instruction queue 418; providing a sequential address to the first instruction to the instruction fetch unit 406; and storing a fourth instruction fetched from the sequential address in the first instruction queue 406.

In another aspect, the first instruction from the first instruction queue is provided to the decode unit. The first instruction from the decode unit is issued for execution. The branch execution unit resolves the first instruction to determine if the prediction made using the entry in the BTB is correct or mispredicted.

In another aspect, the first instruction is provided from the first instruction queue to the decode unit based on whether the first instruction is a hard-to-predict branch. If so, an identifier is provided with the first instruction to the decode unit and the branch execution unit. The identifier identifies a location in the second instruction queue of one or more instructions which are to be executed if the first instruction is mispredicted 420.

In another aspect, if the first instruction is a hard-to-predict branch and predicted as a taken branch, the identifier identifies a location in the second instruction queue of the one or more sequential instructions; and if the first instruction is a hard-to-predict branch and predicted as a not-taken branch, the identifier identifies a location in the second instruction queue of the fourth instruction.

In another aspect, if the branch execution unit determines that the first instruction is mispredicted, using the identifier to provide the one or more instructions from the second instruction queue to the decode unit for execution; and if the branch execution unit determines that the first instruction is predicted correctly, invalidating the one or more instructions in the second instruction queue indicated by the identifier.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processor 12 or on a separate integrated circuit or located within another peripheral or slave discretely separate from other elements of data processing system 10. Peripherals 18 and 20 may also be located on separate integrated circuits or devices.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 16 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, the number of bits used in the address fields may be modified based upon system requirements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having an instruction fetch unit, a decode unit, and a branch execution unit, the instruction fetch unit being coupled to a branch target buffer (BTB), and having a first instruction queue for providing instructions to the decode unit, and a second instruction queue for providing instructions to the decode unit, the decode unit issuing instructions for execution, a method comprising:
   in single thread mode:
      providing a first instruction address to the instruction fetch unit;
      fetching a first instruction from the first instruction address and storing the first instruction in the first instruction queue;
      determining whether the first instruction address hits in the BTB;
      in response to determining that the first instruction address hits in the BTB, using an entry in the BTB which resulted in the hit to determine whether the first instruction is a conditional branch and whether it is predicted as a taken branch or a non-taken branch;
      in response to determining that the first instruction is a conditional branch and predicted as a taken branch:
         providing a target address from the entry in the BTB to the instruction fetch unit;
         fetching a second instruction from the target address and storing the second instruction in the first instruction queue; and
         fetching one or more sequential instructions which are sequential to the first instruction and storing the one or more sequential instructions in the second instruction queue; and
      in response to determining that the first instruction is a conditional branch and predicted as a non-taken branch:

providing the target address from the entry in the BTB to the instruction fetch unit;

fetching a third instruction fetched from the target address and storing the third instruction in the second instruction queue;

providing a sequential address to the first instruction to the instruction fetch unit; and storing a fourth instruction fetched from the sequential address in the first instruction queue;

providing the first instruction from the first instruction queue to the decode unit; and issuing the first instruction from the decode unit for execution, wherein the branch execution unit resolves the first instruction to determine if the prediction made using the entry in the BTB is correct or mispredicted, and if the first instruction is a conditional branch, providing an identifier with the first instruction to the decode unit and the branch execution unit, wherein the identifier identifies a location in the second instruction queue of one or more instructions which are to be executed if the first instruction is mispredicted.

2. The method of claim 1, wherein: if the first instruction is a conditional branch and predicted as a taken branch, the identifier identifies a location in the second instruction queue of the one or more sequential instructions; and if the first instruction is a conditional branch and predicted as a not-taken branch, the identifier identifies a location in the second instruction queue of the fourth instruction.

3. The method of claim 1, further comprising: if the branch execution unit determines that the first instruction is mispredicted, using the identifier to provide the one or more instructions from the second instruction queue to the decode unit for execution.

4. The method of claim 3, further comprising:

if the branch execution unit determines that the first instruction is predicted correctly, invalidating the one or more instructions in the second instruction queue indicated by the identifier.

5. Them method of claim 4, further comprising:

if the branch execution unit determines that the first instruction is predicted correctly, invalidating the identifier.

6. The method of claim 1, wherein the conditional branch is further characterized as one of a hard-to-predict branch or a loop instruction.

7. The method of claim 6, wherein the first instruction is determined to be a conditional branch that is characterized as one of a hard-to-predict branch or a loop instruction based on the entry in the BTB which resulted in the hit.

8. The method of claim 1, further comprising:

in response to determining that the first instruction misses in the BTB, fetching one or more sequential instructions which are sequential to the first instruction and storing the one or more sequential instruction in the first instruction queue.

9. A data processing system, comprising:

a branch execution unit;

a decode unit coupled to the branch execution unit, the decode unit issuing instructions for execution;

an instruction fetch unit coupled to a branch target buffer (BTB), the instruction fetch unit having a first instruction queue for providing instructions to the decode unit, and a second instruction queue for providing instructions to the decode unit, wherein during single thread mode, the instruction fetch unit:

fetches a first instruction from a first instruction address and stores the first instruction in the first instruction queue;

determines whether the first instruction address hits in the BTB, and in response to determining that the first instruction address hits in the BTB, using an entry in the BTB which resulted in the hit to determine whether the first instruction is a conditional branch and whether it is predicted as a taken branch or a non-taken branch;

in response to determining that the first instruction is a conditional branch and predicted as a taken branch:

obtaining a target address from the entry in the BTB;

fetching a second instruction from the target address and storing the second instruction in the first instruction queue; and fetching one or more sequential instructions which are sequential to the first instruction and storing the one or more sequential instruction in the second instruction queue; and in response to determining that the first instruction is a conditional branch and predicted as a non-taken branch:

obtaining the target address from the entry in the BTB;

fetching the second instruction from the target address and storing the second instruction in the second instruction queue;

fetching a third instruction from a sequential address that is sequential to the first instruction address; and storing the third instruction in the first instruction queue, wherein:

the instruction fetch unit provides the first instruction from the first instruction queue to the decode unit; and the decode unit issues the first instruction for execution, wherein the branch execution unit resolves the first instruction to determine if the prediction made using the entry in the BTB is correct or mispredicted; and storage circuitry, wherein when the instruction fetch unit determines that the first instruction is a conditional branch, an identifier is stored in the storage circuitry to identify a location in the second instruction queue of one or more instructions which are to be executed if the first instruction is resolved as mispredicted.

10. The data processing system of claim 9, wherein: if the branch execution unit determines that the first instruction is mispredicted, the instruction fetch unit uses the identifier to provide the one or more instructions from the second instruction queue to the decode unit for execution; and if the branch execution unit determines that the first instruction is predicted correctly, the instruction fetch unit uses the identifier to invalidate the one or more instructions in the second instruction queue.

11. The data processing system of claim 9, wherein the conditional branch is further characterized as one of a hard-to-predict branch or a loop instruction, wherein the instruction fetch unit uses the entry in the BTB which resulted in the hit to characterize the conditional branch as one of a hard-to-predict branch or a loop instruction.

12. In a data processing system having an instruction fetch unit, a decode unit, and a branch execution unit, the instruction fetch unit having a branch target buffer (BTB), a first instruction queue for providing instructions to the decode unit, and a second instruction queue for providing instructions to the decode unit, the decode unit issuing instructions for execution, a method comprising:

in single thread mode:
  providing a first instruction address to the instruction fetch unit;
  fetching a first instruction from the first instruction address and storing the first instruction in the first instruction queue;
  determining whether the first instruction address hits in the BTB;
  in response to determining that the first instruction address hits in the BTB:
    using an entry in the BTB which resulted in the hit to determine whether the first instruction is predicted as a taken branch or a non-taken branch, and
    determining whether the first instruction is a hard-to-predict branch;
  in response to determining that the first instruction is predicted as a taken branch and is a hard-to-predict branch:
    providing a target address from the entry in the BTB to the instruction fetch unit;
    fetching a second instruction from the target address and storing the second instruction in the first instruction queue; and
    fetching one or more sequential instructions which are sequential to the first instruction and storing the one or more sequential instruction in the second instruction queue; and
  in response to determining that the branch instruction is predicted as a non-taken branch and is a hard-to-predict branch:
    providing the target address from the entry in the BTB to the instruction fetch unit;
    fetching a third instruction fetched from the target address and storing the third instruction in the second instruction queue;
    providing a sequential address to the first instruction to the instruction fetch unit; and
    storing a fourth instruction fetched from the sequential address in the first instruction queue;
  providing the first instruction from the first instruction queue to the decode unit, and if the first instruction is a hard-to-predict branch, providing an identifier with the first instruction to the decode unit and the branch execution unit, wherein the identifier identifies a location in the second instruction queue of one or more instructions which are to be executed if the first instruction is mispredicted; and
  issuing the first instruction from the decode unit for execution, wherein the branch execution unit resolves the first instruction to determine if the prediction made using the entry in the BTB is correct or mispredicted.

13. The method of claim 12, wherein: if the first instruction is a hard-to-predict branch and predicted as a taken branch, the identifier identifies a location in the second instruction queue of the one or more sequential instructions; and if the first instruction is a hard-to-predict branch and predicted as a not-taken branch, the identifier identifies a location in the second instruction queue of the fourth instruction.

14. The method of claim 12, further comprising: if the branch execution unit determines that the first instruction is mispredicted, using the identifier to provide the one or more instructions from the second instruction queue to the decode unit for execution; and if the branch execution unit determines that the first instruction is predicted correctly, invalidating the one or more instructions in the second instruction queue indicated by the identifier.

* * * * *